United States Patent [19]
Day et al.

[11] 4,082,919
[45] Apr. 4, 1978

[54] INTERCONNECT CONTROL FOR AUTOMATICALLY CONNECTING A SIMPLEX OR HALF-DUPLEX RADIO NETWORK TO A STANDARD TELEPHONE SYSTEM

[75] Inventors: Willis E. Day, Pittsford, N.Y.; Glenn S. Danford, Oklahoma City, Okla.; Kenneth C. Johnson, Beaverton, Oreg.

[73] Assignee: IEC Electronics Corporation, Newark, N.Y.

[21] Appl. No.: 736,357

[22] Filed: Oct. 27, 1976

[51] Int. Cl.² ............................................. H04Q 7/04
[52] U.S. Cl. .................................. 179/2 EA; 325/55; 325/64; 179/1 VC
[58] Field of Search ............... 179/41 A, 2 E, 1 VC, 179/1 CN, 1 HF; 325/21, 22, 55, 64

[56] References Cited
U.S. PATENT DOCUMENTS

| | | | |
|---|---|---|---|
| 3,254,159 | 5/1966 | Condict | 325/22 |
| 3,366,880 | 1/1968 | Driver | 179/41 A |
| 3,397,401 | 8/1968 | Winterbottom | 325/22 |
| 3,410,964 | 11/1968 | Kelsey | 179/1 VC |
| 3,557,312 | 1/1971 | Vogelman et al. | 179/41 A |
| 3,586,978 | 6/1971 | VanGorder | 179/41 A |

Primary Examiner—Kathleen Claffy
Assistant Examiner—Gerald L. Brigance
Attorney, Agent, or Firm—Hoffman Stone

[57] ABSTRACT

An interconnect circuit arrangement for patching a simplex or half-duplex radio network into a standard telephone system. It includes means for sending beep tones to the parties at the end of each message so that they can readily recognize when each is supposed to talk. The tones are sent automatically when the party on the telephone system concludes his messages, and under manual control of the party at the radio end when he concludes his. Special access codes are provided to prevent unauthorized access to the radio system and to set the circuit for special functions. Various override features are included to facilitate operation and avoid time delays that have heretofore tended to hinder conversations in VOX simplex and half-duplex radio systems.

4 Claims, 12 Drawing Figures

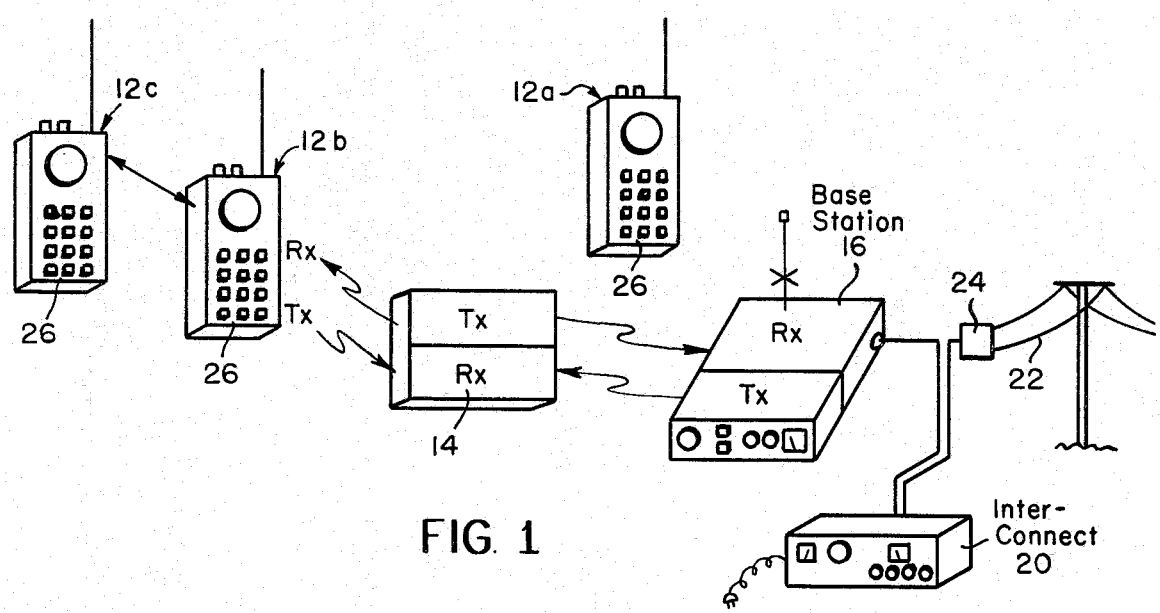
FIG. 1
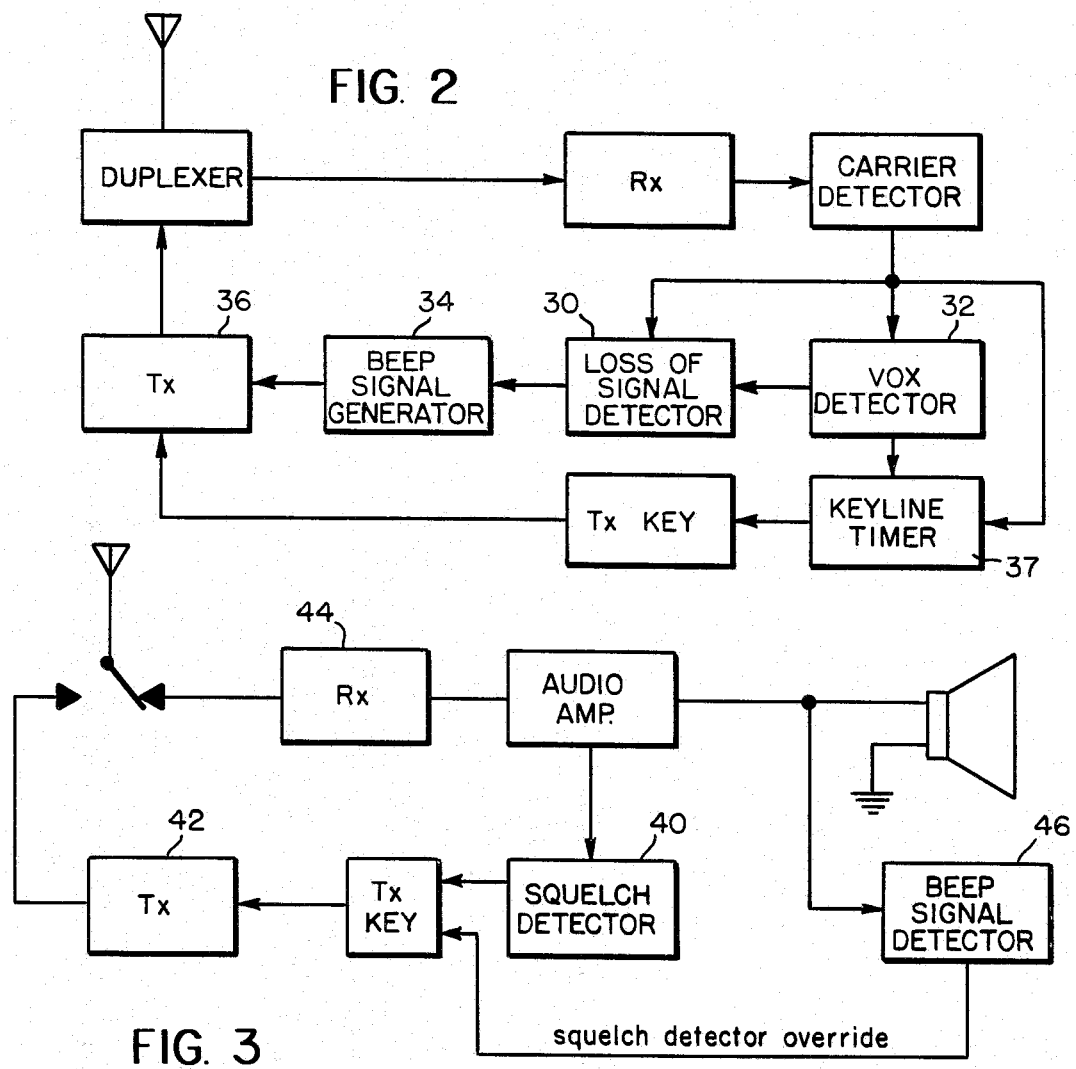
FIG. 2
FIG. 3

INTERCONNECT CONTROL FOR AUTOMATICALLY CONNECTING A SIMPLEX OR HALF-DUPLEX RADIO NETWORK TO A STANDARD TELEPHONE SYSTEM

BRIEF DESCRIPTION

The present invention relates to a novel circuit arrangement for effecting connections between two-way field radios of the simplex and half-duplex types and a conventional telephone line, allowing any of the field radios to dial into the telephone line and any telephone in the telephone system to dial into the radio network, and providing a novel, very simple method to indicating to the parties when it is each one's turn to talk.

Simplex and half-duplex gear is much simpler, less expensive, and less bulky than full duplex and there is a substantial demand for workable mobile radio-telephone service using simplex or half-duplex gear at the radio end. This is what the present invention provides, and on an automatic, unmanned basis.

Conventional mobile radio-telephone systems are of the full duplex type, and in those systems the called and the calling parties may both talk and listen simultaneously. In simplex and half-duplex systems, on the other hand, the parties must take turns talking.

This requirement of taking turns to talk is readily handled by the trained radio operator, especially if his hand set has a push-to-talk switch, but has heretofore presented serious problems when the simplex or half-duplex radio facility was patched into a full duplex system.

A major problem in achieving satisfactory mobile radio-telephone service with simplex or half-duplex gear is letting the parties know when it is time to talk, especially the party on the telephone end of the connection, who is seldom trained in radio procedures and usually has the natural tendency to speak up whenever the urge strikes him. The problem is effectively resolved in the practice of the invention by sending special beep tones to the parties at the end of each message during a connection. When the party on the telephone line stops talking the beep tones are automatically generated by so-called voice responsive circuitry (VOX) and when the party on the field transceiver ends his message he sends a beep signal by manual control to alert the telephone party, and also to cause the transmitter at the base station of the radio system to be turned on, readying it for the next message from the telephone party.

The circuit of the invention also includes means for limiting access to the radio network by requiring a party calling from the telephone line to dial an access code, thus preventing access by crank callers or those inadvertently dialing a wrong number. Timing circuits are provided for limiting the duration of any single message, and the duration of any call. Means are included for enabling a field transceiver to dial into the telephone system, for overriding certain delays usually incorporated in VOX circuitry thereby allowing conversations to proceed naturally, and for various other functions including alternative modes of response to an incoming call from the telephone line.

In the embodiment of the invention described herein the radio system is of the kind known as simplex and half-duplex. It may be assumed that the radio network in its unmodified form consists of a number of walkie-talkies each capable of transmitting and receiving on at least two different carrier frequencies. In the conventional way any two of the walkie-talkies may converse in simplex mode, alternately transmitting and receiving on only a single carrier frequency. Commonly, repeaters are used with systems of this kind, in which case each walkie-talkie must receive on a different frequency from the one it uses to transmit. This is called the half-duplex mode.

In accordance with the invention one transceiver is designated a base station, and an interconnect control circuit equipped with VOX gear is connected between it and a conventional telephone line. The control circuit appears on the telephone line just like a conventional subscriber station. Each of the field transceivers for which telephone access is desired is equipped with a tone dialing set, preferably of the twelve or sixteen push button type.

To call into the radio net the telephone party dials the number assigned to the interconnect control circuit, which then, in its normal mode, goes off hook and answers with a short beep. The calling party then dials a selected code, typically a two digit code beginning with a non-number key of his tone dialing set. (As presently arranged, for reasons of economy, the interconnect control is not capable of reading incoming rotary dial pulses, so the calling telephone party must either have a tone dialing telephone or a tone dialer that he can couple to his line.)

When the access code is received the control responds by turning on the transmitter at the base station and the caller thereupon orally calls for the specific party or field transceiver he wants. Alternatively, the control may be set so that it does not, itself, answer the incoming call, but, instead, simply keys on the base station transmitter and transmits beep tones in response to the ring signals.

The telephone answering function of the control is inhibited whenever the radio network is in use so an incoming telephone call cannot interfere with normal communications.

Since the system is designed for connection to an ordinary telephone line, the interconnect control is voice signal responsive; it includes VOX gear. The interconnect control is arranged to modify the normal operation of the VOX gear to expedite conversations, to avoid certain delays that would otherwise be encountered, and to avoid loss of information ordinarily suffered due to the so-called attack time and release time of the VOX circuitry.

For a call going out from a field transceiver to the telephone line, the field party dials the access code, whereupon the interconnect control goes off-hook, listens for dial tone from the telephone line, and when dial tone is received, keys the base station transmitter alternately on and off at about four second intervals. During the intervals when the transmitter is on dial tone is sent to the field transceiver. During the alternate intervals the field party may seize the base station by dialing the telephone number he wants. When he finishes dialing the desired number he presses his "end of message" button, in response to which the interconnect control turns the base station transmitter on.

The transmitter is then switched alternately on and off by its VOX gear, following the ring back signals from the telephone line until the called party answers. It is switched on by the VOX gear responsively to the answer, and switched off when the called party stops talking. The beep tone signals are then transmitted to both parties, and the party at the field transceiver takes his turn.

Various control functions are included for limiting the durations of individual messages and connections, as well as for modifying the operation of the VOX gear, and sensing means are included to enable remotely controlled switching of the operational modes of the interconnect control. In addition, a translator may be included to enable the control to generate outgoing dial signals of the kind required by the telephone line if they are different from the tone signals produced by the tone dial sets in the field transceivers.

An added feature of the invention relates to the provision of detection circuitry in the radio repeater for producing an end-of-message beep tone signal relatively soon after a party stops talking and before the repeater transmitter is turned off by the normal timer circuit, thus allowing the other party to start his message without waiting for the normal "time out" of the repeater.

In the system as described the base transceiver and interconnect control include VOX interlock circuits that prevent activation of the transmitter so long as an incoming signal is present in the receiver, and according to the invention, the interconnect control is equipped with means for detecting the end-of-message beep signals and inhibiting the VOX interlock in response to them.

DETAILED DESCRIPTION

A representative embodiment of the invention will now be described in conjunction with the drawings, wherein:

FIG. 1 is a schematic diagram of a typical simplex and half-duplex radio network with an interconnect control according to the invention for connecting the network to a telephone line;

FIG. 2 is a schematic circuit diagram of a repeater according to the invention including means for producing an end-of-message tone signal;

FIG. 3 is a schematic circuit diagram of a transceiver according to the invention including means for overriding the VOX interlock;

Figure 4:
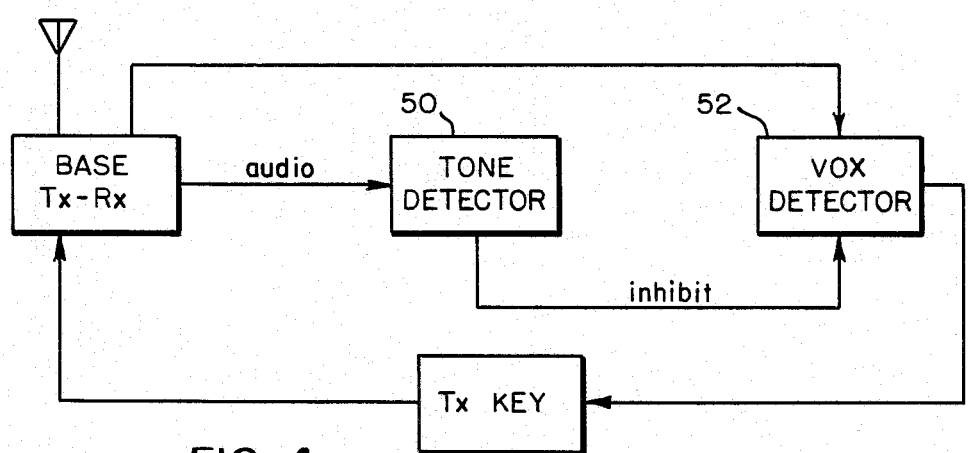
FIG. 4 is a schematic circuit diagram of a transceiver according to the invention including alternative means for overriding the VOX interlock in response to a received tone signal.

The radio system shown in FIG. 1 is mostly conventional, and of the simplex and half-duplex type. It includes a number of field transceivers 12a, 12b, and 12c, which can talk with each other by direct simplex transmission, or through a repeater 14 in half-duplex mode. It also includes a base station transceiver 16, which need not be manned, and an interconnect control 20. The base station transceiver 16 operates in simplex mode when in direct communication with one of the field transceivers, and in half duplex mode when communicating through the repeater 14. A regular single party telephone line 22 is connected to the interconnect control 20, either directly if allowed, or through a coupling device 24 supplied by the telephone operating company.

The interconnect control 20, in conjunction with the base station transceiver 16, effects connections between any of the field transceivers 12a, 12b, and 12c and the telephone line 22, thus enabling mobile radio-telephone service in the network.

Each of the field transceivers 12a, 12b, and 12c is equipped with a multi-frequency (DTMF) tone dialing set 26 for modulating its transmitter with tone dialing signals. If the base station transceiver 16 is to be manned it, also, should have a tone dialing set, although in the embodiment shown it is assumed that the base station is not manned, and, accordingly, a tone dial set is not shown with it.

In accordance with the invention, as shown in FIG. 2, the repeater 14 may be modified from the conventional form by including a loss of signal detector 30 having a shorter time out period than the conventional keyline timer 37, and a beep signal generator 34 connected to an input of the transmitter 36.

In conventional operation the keyline timer 37 usually holds the transmitter keyed on for a considerable interval following the end of a message, say about 3 to 5 seconds, during which the called party is not certain whether the calling party has completed his message. Moreover, if the base transceiver is equipped with VOX interlock circuitry, the base station transmitter remains inhibited until the transmitter 36 in the repeater is unkeyed.

The modification of the repeater just described enables avoidance of the bothersome delay caused by the relatively long time out of the conventional keyline timer 37, and also avoidance of the loss of information due to the attack time of the detector 32 in re-keying the transmitter. When a party stops talking, the detector 30 generates an end-of-message signal within about ½ to 1 second. The signal is applied to the beep signal generator 34 to transmit a short beep tone, which informs the responder that the first party has completed his message, and allows the interconnect control to override the lock out circuitry and key the base transmitter. If the responder then answers fairly promptly, the conventional timer 37 responds and holds the transmitter 36 keyed on so that the conversation may continue with minimum interruption.

FIGS. 3 and 4 show arrangements according to the invention for inhibiting the VOX interlock in the base transceiver in response to the beep tone signal from the repeater. As shown in FIG. 3, the conventional VOX interlock includes an audio signal detector 40, which operates to inhibit the transmitter 42 so long as an audio signal persists in the receiver 44. In the practice of the invention a beep signal detector 46 is arranged to detect a beep signal at the output of the receiver 44, and, responsively to it, override the detector 40 and key the transmitter on.

A modified arrangement for overriding the VOX interlock is shown in FIG. 4. In this version, the beep tone detector 50 is connected to inhibit the VOX end-of-message audio signal detector 52, causing it to produce a time out signal and key the transmitter on immediately upon the occurrence of the beep tone signal.

Figure 5:
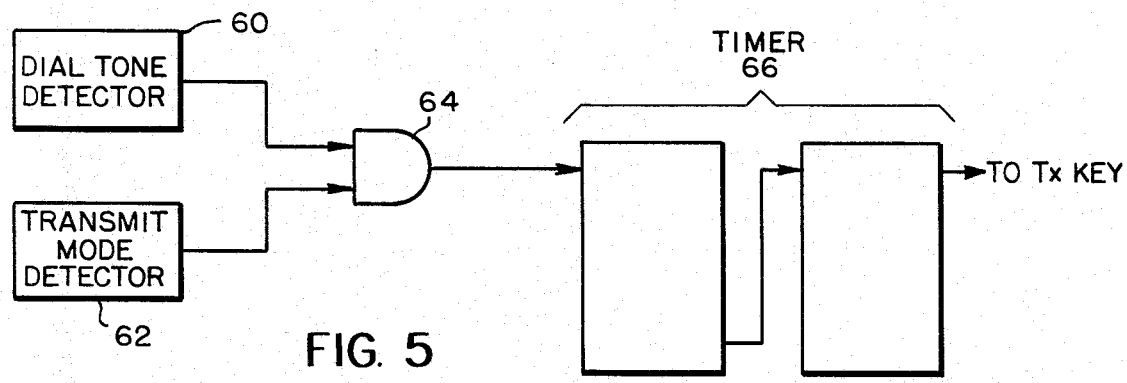
FIG. 5 is a schematic circuit of an arrangement in the interconnect control for transmitting dial tone to the field transceivers.
Figure 9:
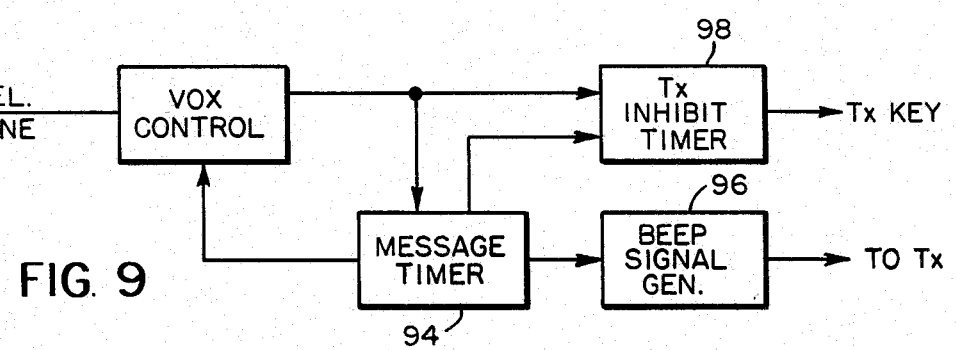
FIG. 9 is a schematic circuit diagram of a timer control for limiting the duration of messages that come in through the telephone line.

FIG. 5 illustrates the so-called dial tone forcing function, which operates to transmit telephone dial tone for alternate intervals, letting a party at a field transceiver know that dial tone is present on the telephone line, and giving him a chance to seize the base station receiver to dial out the number he wants. When a party at one of the field transceivers wants to place a call into the telephone line, he dials the access code, and the interconnect unit responds by going off hook. When dial tone is received the VOX gear in the base station transceiver 16 keys the base station transmitter on to broadcast dial tone to the field transceiver. In the control a dial tone detector 60 detects the dial tone on the incoming telephone line, and a transmit mode detector 62 detects the keying on of the transmitter. The outputs of the detectors 60 and 62 are applied through an AND gate 64 to set a timer 66 at the moment the transmitter comes on. The timer 66 then times two successive intervals of approximately equal duration. First, immediately following the set signal from the AND gate 64, it times a dwell interval of, say, about 4 seconds, during which the transmitter at the base station remains keyed on. Then follows an inhibit interval during which the transmitter is inhibited. The process is repetitive until loss of dial tone caused by one of the field transceivers seizing the base station by dialing a number, or by the interconnect control going back on hook in response to a signal from the time out timer (FIG. 9).

When the field transceiver seizes the base station by dialing a desired number to be called in the telephone system, dial tone is removed from the line by the telephone central office gear, and the timer 66 is not set again.

Figure 6:
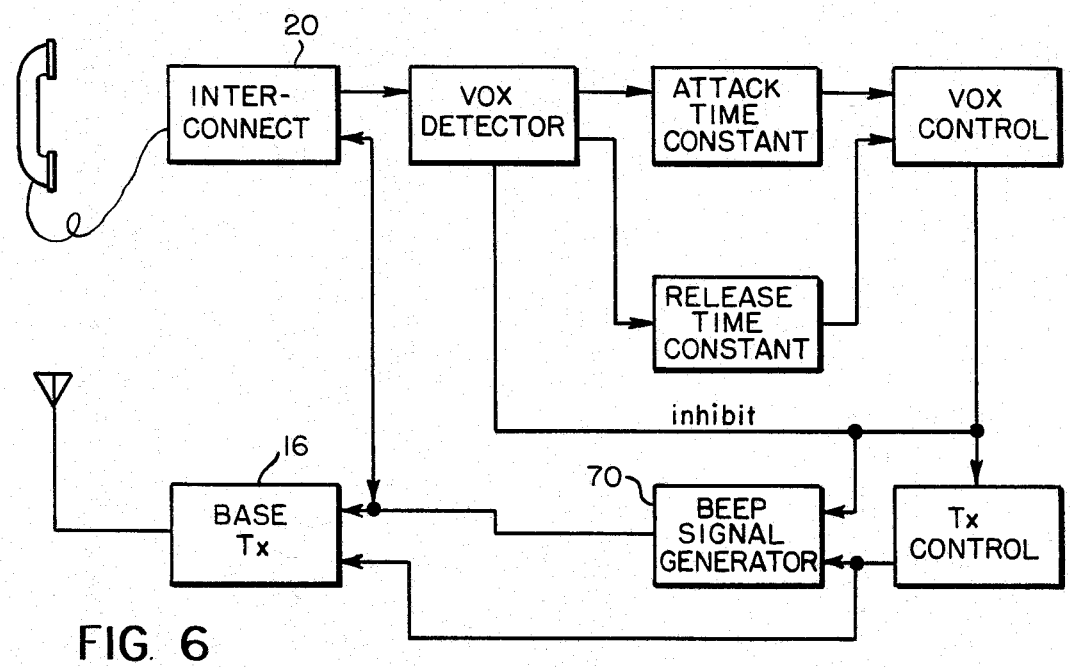
FIG. 6 is a schematic circuit diagram of a portion of the interconnect control arranged to produce an end-of-message tone signal in response to the ending of a message from the telephone system.

Thereafter, the operation functions according to the circuit outlined in FIG. 6, which shows the VOX gear and functions at the base station 16 and the interconnect control 20. When dialing is complete the VOX gear follows the ring back tones on the telephone line, keying on the transmitter at the base station to broadcast each burst of ring back tone. When the called station answers, the VOX gear keys on the transmitter to accept the called party's opening remark and broadcast it to the field transceiver.

The interconnect control 20 includes a beep tone generator 70, which is responsive to the VOX gear and operates a short time after the end of the answerer's message to transmit a beep tone to the field transceiver to indicate to the party there that the telephone party has completed his opening message.

The party at the field transceiver then speaks his piece, and when he is through he presses a selected one of the push buttons on his tone dialing set, preferably one of the non-number buttons. The tone generated by the selected push botton is transmitted to the party on the telephone line, indicating to him that it is now his turn to talk. The conversation thus continues supervised by the end-of-message beep tones. Preferably the tone generated by the generator 70 in the interconnect control is different in sound from the tone generated by the selected button on the field party's tone dial set, thereby ensuring that the parties can distinguish whose turn it is to speak in response to each of the end-of-message tone signals.

Figure 7:
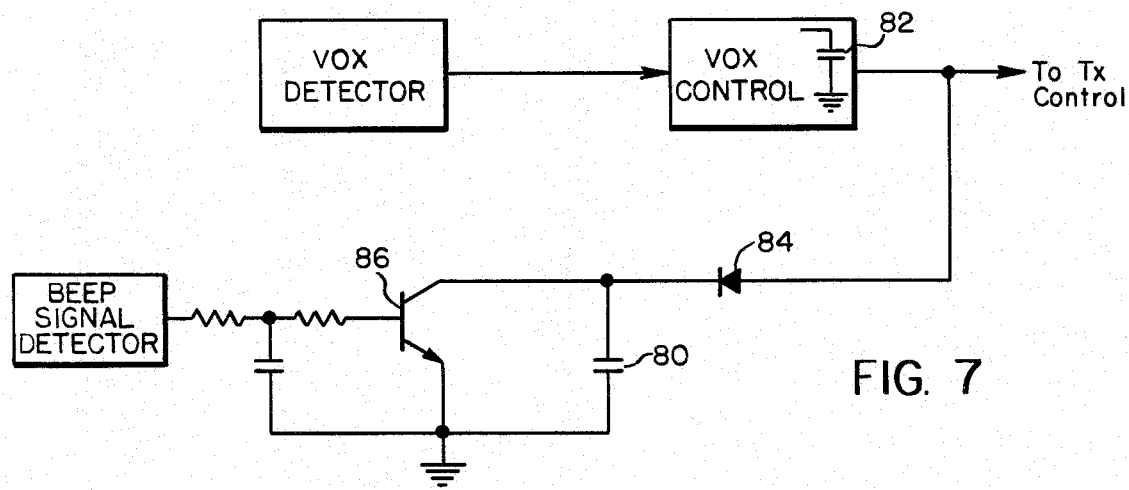
FIG. 7 is a schematic circuit diagram of a portion of the control arranged for extending the VOX time out delay at the beginning of a message to a value longer than its normal duration.

FIG. 7 illustrates a circuit arrangement for extending the VOX release time constant at the beginning of each message. VOX gear is usually made with an adjustable drop out time, normally within a range of about $\frac{1}{4}$ to 3 seconds, and the common tendency is to set it at about one second or less so as to speed up conversations. According to the invention the normal drop out time constant may be set near its minimum value, yet drop out is avoided at the beginning of each message even though the audio signal may be absent then for longer than the minimum time. It is usually at the beginning of a message that the speaker delays more than during the course of it; he often takes time to formulate his message before starting it, but once started he usually continues with only very short gaps between sounds.

To this end, in the circuit as shown, a capacitor 80 is connected in parallel with the VOX time out capacitor 82 through a diode 84. When the interconnect control 20 detects the end-of-message beep signal from the field transceiver it switches a transistor 86 on momentarily, i.e. for as long as the signal persists. The collector to emitter path of the transistor 86 is connected in parallel with the capacitors 80 and 82 to discharge them rapidly when the transistor is switched on. After the two capacitors 80 and 82 are discharged, the VOX time out is a function of the sum of the values of the capacitors, and the transmitter remains keyed on at least until both capacitors are charged to the trigger value. Thereafter, during the remainder of the message, the VOX gear acts normally, with its time out interval timed only by the regular time out capacitor 82 because discharge of the added capacitor 80 is prevented by the diode 84.

Figure 8:
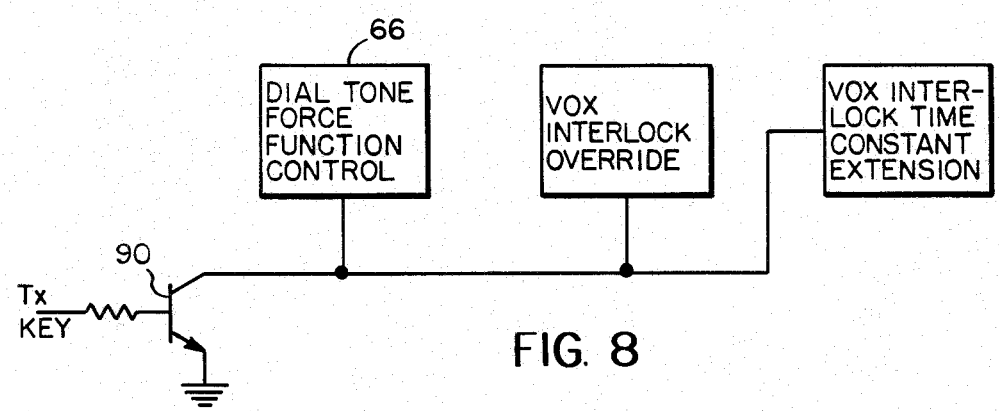
FIG. 8 is a schematic circuit diagram of a portion of the control arranged for avoiding undesired operation of certain portions of the system.

As shown in FIG. 8, undesired interruptions due to operation of the dial tone transmit timer 66 (FIG. 5) the VOX interlock override circuit (FIGS. 3 and 4) and the time out extension circuit (FIG. 7) are positively avoided by blocking these circuits during times when the transmitter at the base station is off. The circuits for these functions are connected through the collector to emitter path of a blocking transistor 90 which is biased normally beyond cut-off and switched to saturation in response to the signal that keys the transmitter on.

The message timer 94 is shown in FIG. 9. It operates responsively to the VOX gear at the base station to limit the duration of each message from the telephone line to the radio network. It is set in response to the keying on of the transmitter, and times two intervals of adjustable duration. The first interval may be, for example, about twenty seconds, at the end of which a first signal is produced to trigger a beep tone generator 96 to warn the telephone party that he will soon be cut off. The second interval may be, typically, about 5 seconds, after which a second signal is produced to trigger a transmit inhibit timer 98. The transmit inhibit timer 98 then inhibits the transmitter for a selected interval of, say, 5 seconds to enable the radio party to seize the system.

Figure 10:
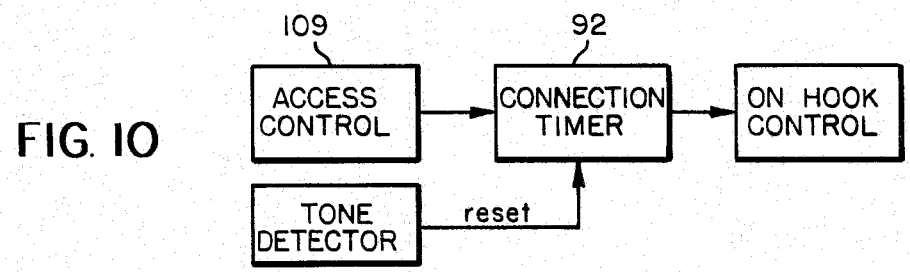
FIG. 10 is a schematic circuit diagram of a timer control for limiting the duration of connections made through the interconnect control.

As shown in FIG. 10, the duration of a connection is limited by a timer 92, which may be adjusted to any desired interval such as, for example, between 2 and 5 minutes. The timer 92 is started in response to the access code, and the interconnect control can stay off hook only during the time out period of the timer. The timer 92 may be reset during a connection simply by dialing the reset signal, typically the tone dial button designated with an asterisk, so that operation is under control of the parties to the connection while they are on the line, but if they forget to dial the "hang up" code at the end of the connection, or if a called party fails to answer, or if a party at a transceiver fails to dial out his wanted number within the connection time limit, the interconnect control goes back on hook automatically.

Dialing in the radio network is by so-called DTMF tone signals, but the nature of dialing on the telephone line must be compatible with the gear at the central telephone office. Where the telephone out-dialing must be different from the tone dialing signals used in the radio network, a translator is included in the control circuit. If desired, the control may be set up at the time it is installed to produce the required kind of out-dialing signals when it is accessed by a standard code signal, and the operators of the field transceivers neeed not be aware of the kind of out-dialing signals applied to the telephone line.

Figure 11:
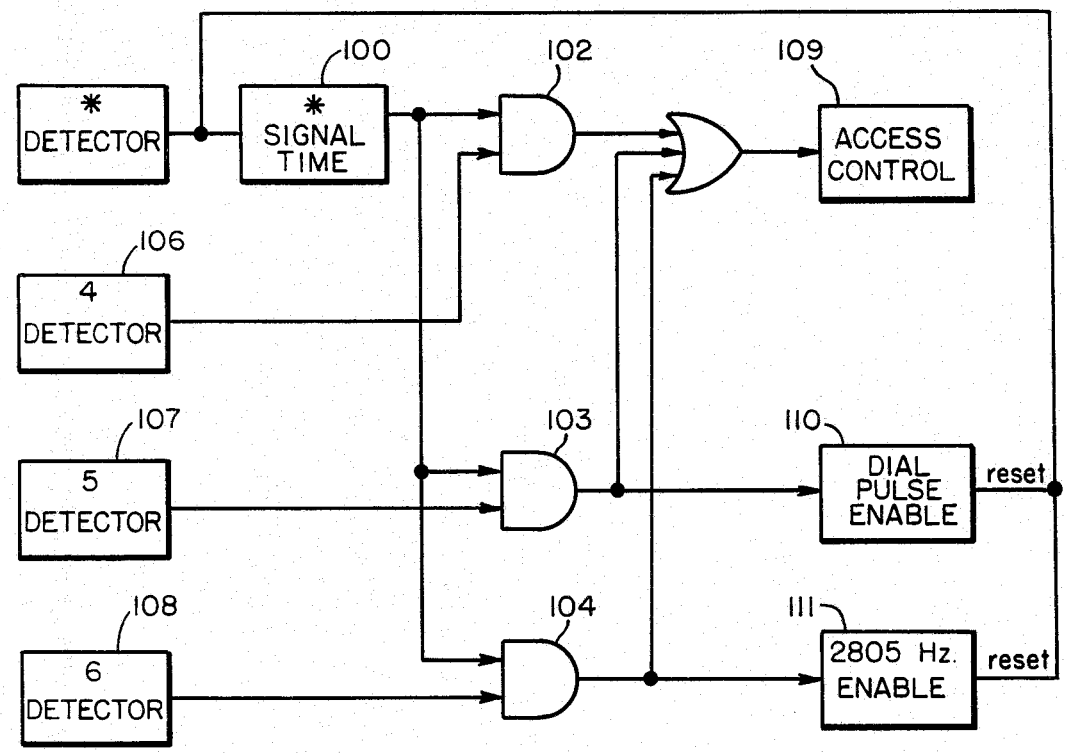
FIG. 11 is a schematic circuit diagram of a portion of the control arranged to ensure that a party on the radio net making an outgoing call to the telephone line may select the required out-dialing mode.
Figure 12:
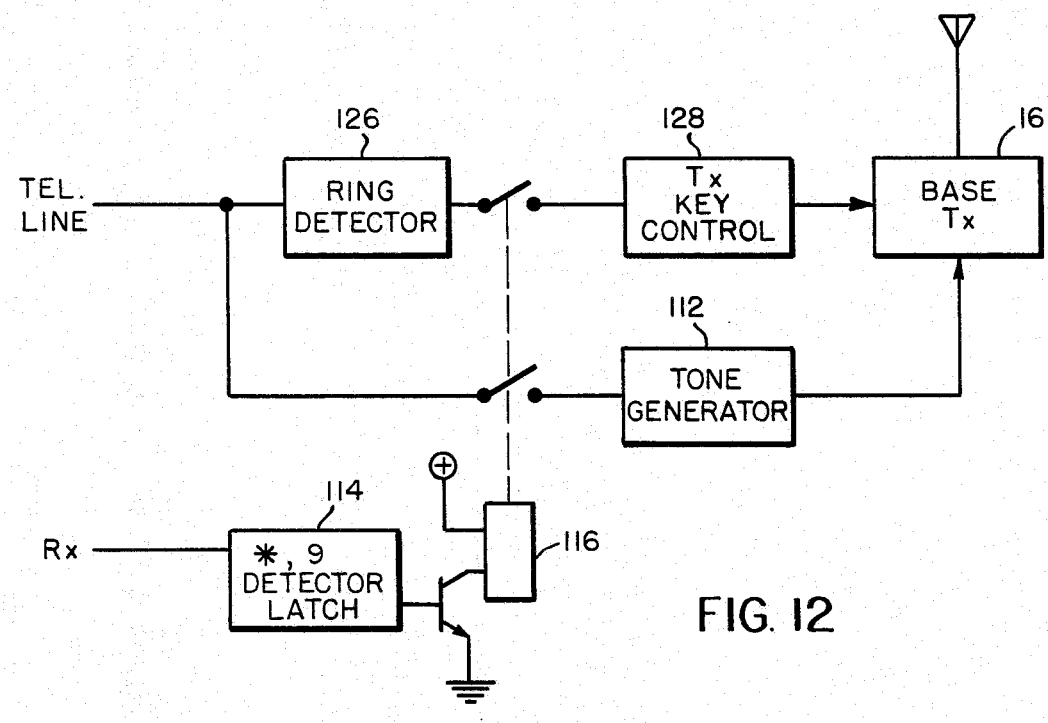
FIG. 12 is a schematic circuit diagram of a portion of the control arranged for switching its answering mode in response to a signal from a field transceiver.

It has been found, however, that dial signal translators sometimes respond to normal audio signals, and if they remain enabled during a connection they may interrupt a conversation, or even cause the central exchange to break the connection. It is preferred, therefore, to set up the control as shown in FIG. 11. The control is equipped with two translators 110 and 111, one for producing rotary dial pulses, and one for single tone pulses, the two dial signal systems most commonly used aside from the DTMF system. The field operator must then dial a different respective access code for each kind of out-dialing, and when he is through dialing through one of the translators 110 and 111, he is more likely to remember to dial the reset code (in the case shown this is the first digit of all the access codes) than if he were not required to select the right translator. Also, with this arrangement, the control may be connected to almost any subscriber line without need to ascertain which kind of dial signals the central office responds to, nor to pre-set the control; the field operators will discover the required mode by trial and error.

The arrangement is shown in FIG. 11. The first digit for all the access codes is the same, one of the non-number push buttons such as the one marked with an asterisk. When this signal is received at the interconnect control it is detected and applied to a persistence circuit 100, such as a monostable multivibrator, the output of which is applied to several AND gates 102, 103, and 104, one for each type of out dialing it is desired to provide for. Separate detectors 106, 107, and 108 are included for detecting the second digits of the access codes, and their outputs are applied respectively and separately to the gates 102, 103, and 104. The outputs of the AND gates 102, 103, and 104 are OR'ed to the master access control 109, and separately applied to the respective dial signal translators 110 and 111, which generate out-dialing signals of the needed type in response to the tone dial signals received from the field transceivers. In cases where the telephone line is equipped to respond to dial signals of the kind generated by the field transceivers, no translation is necessary, and the dial signals may be transmitted directly through the master access control, as is done in the circuit shown in the case of the first "second digit" detector 106.

Alternatively to the mode of receiving calls from the telephone system described hereinabove, the interconnect control 20 may be set by dial signals from any of the field transceivers not to go off hook in response to an incoming ring signal, but, instead, to broadcast beep tone signals in response to them. This circuit is shown in FIG. 10. In response to the receipt of the selected "mode" code dial signals, a detector 114 causes a self holding relay 116 to pick up, connecting the output of the ring detector 108 to the transmitter key control 110, and connecting the telephone line to a beep tone generator 112. The transmitter at the base station 16 is thus keyed on for each burst of ring signal, and modulated by the beep tone generator 112 while it is on to broadcast the beep tones to the field transceivers. While in this receive mode the interconnect control 20 may be made to go off hook, and may be accessed for control of special functions only by the field transceivers, not by signals from the telephone line.

It will be apparent that other special functions may be provided for in the control 20 such as, for example, control of a recording device, selection of tone coder frequency such as is used selectively to address specific repeaters, control of a scrambler, or selection of a desired transmission carrier frequency. Activation of the special functions is controlled by respective two digit code signals from the tone dialing sets.

As presently arranged, one of the parties to a radiotelephone connection should dial a "hang up" code at the end of a conversation, and this hang up code is used to cancel all special functions such as the alternate receive mode in addition to causing the interconnect control to go back on hook. As hereinabove stated, if the "hang up" code is not dialed, the control goes back on hook when the timer 92 times out.

What is claimed is:

1. A control circuit for effecting a connection between a telephone system of the full duplex type and a radio signalling system of the kind in which the parties to a connection cannot each send and receive simultaneously comprising:
   a. means for terminating a subscriber station telephone line and for selectively and alternately placing on hook and off hook signals on the line,
   b. means for receiving signals from the receiver portion and applying signals to the transmitter portion of a selected transceiver in the radio system,
   c. means for applying signals received from said receiver portion to the telephone line, and for applying signals received from the telephone line to said transmitter portion,
   d. a beep signal generator connected to an input of said transmitter portion for broadcasting beep signals, and
   e. audio signal responsive means for activating said beep signal generator at the end of a predetermined interval following the loss of an audio signal from the telephone line.

2. A control circuit according to claim 1, wherein one or more of the transceivers in the radio system other than said selected transceiver includes a tone dial set, and the control circuit includes means for keying the transmitter portion of the selected transceiver on in response to a predetermined signal received from one of the tone dial sets, thereby to ready the selected transceiver to receive and broadcast a message from the telephone line.

3. A control circuit according to claim 1 wherein said selected transceiver includes VOX gear for keying said transmitter portion on and off responsively to the occurrence and loss, respectively, of an audio signal on the telephone line, said VOX gear having a delayed drop out of predetermined duration, and said control circuit includes means for increasing the drop out interval of said VOX gear in response to reception of a preselected signal by said receiver portion.

4. A control circuit for effecting a connection between a telephone system of the full duplex type and a radio signalling system of the kind in which the parties to a connection cannot each send and receive simultaneously comprising:

a. means for terminating a subscriber station telephone line and for selectively and alternately placing on hook and off hook signals on the line,
b. means for receiving signals from the receiver portion and applying signals to the transmitter portion of a selected transceiver in the radio system,
c. means for applying signals received from said receiver portion to the telephone line, and for applying signals received from the telephone line to said transmitter portion,
d. means responsive to a predetermined signal received by said receiver portion for placing an off hook signal on the telephone line, and
e. means responsive to a dial tone signal on the telephone line for alternately keying said transmitter portion on and off for predetermined intervals thereby to broadcast dial tone to a remote receiver during time-spaced intervals.

* * * * *